United States Patent
Rochford, II et al.

(10) Patent No.: US 7,080,247 B2
(45) Date of Patent: Jul. 18, 2006

(54) SYSTEM AND METHOD FOR AUTOMATED DISPLAY DRIVER MANAGEMENT

(75) Inventors: Keith Garrett Rochford, II, Yorba Linda, CA (US); Taisheng Han, Placentia, CA (US)

(73) Assignee: EVGA Corporation, Brea, CA (US)

( * ) Notice: Subject to any disclaimer, the term of this patent is extended or adjusted under 35 U.S.C. 154(b) by 284 days.

(21) Appl. No.: 10/128,150

(22) Filed: Apr. 22, 2002

(65) Prior Publication Data
US 2004/0025156 A1 Feb. 5, 2004

Related U.S. Application Data

(63) Continuation-in-part of application No. 09/747,783, filed on Dec. 22, 2000, now Pat. No. 6,832,312.

(60) Provisional application No. 60/285,396, filed on Apr. 16, 2001.

(51) Int. Cl.
*G06F 9/24* (2006.01)
*G06F 13/10* (2006.01)
(52) U.S. Cl. .................................. 713/100; 710/8
(58) Field of Classification Search ............... 713/1, 713/2, 100; 710/8, 10, 62, 104
See application file for complete search history.

(56) References Cited

U.S. PATENT DOCUMENTS

| | | | | | |
|---|---|---|---|---|---|
| 6,032,201 | A | * | 2/2000 | Tillery et al. | 710/8 |
| 6,345,319 | B1 | * | 2/2002 | Lin et al. | 710/8 |
| 6,557,065 | B1 | * | 4/2003 | Peleg et al. | 710/300 |

FOREIGN PATENT DOCUMENTS

JP 05265927 A * 10/1993

OTHER PUBLICATIONS

Dr. Mordrid—"Manufacturer of Motherboard"—Feb. 1, 1998—Newsgroups: comp.sys.ibm.pc.hardware, comp.sys.ibm.pc.hardware.misc, comp.sys.ibm.pc.hardware.system.*
Robert J. Niland—"New Video Card Install"—Dec. 31, 1998—Newsgroups: comp.sys.hp.misc.*

* cited by examiner

*Primary Examiner*—Thuan Du
(74) *Attorney, Agent, or Firm*—Buchanan Ingersoll LLP

(57) ABSTRACT

A method and system of an automated computer video display driver management system in setting up a video driver for a corresponding video display controller adapter is disclosed. The process including the steps of verifying motherboard chipset, removing pre-existing driver files, and installing appropriate driver files for the video display controller adapter installed in the computer system.

12 Claims, 7 Drawing Sheets

SYSTEM AND METHOD FOR AUTOMATED DISPLAY DRIVER MANAGEMENT

CROSS REFERENCE TO RELATED APPLICATIONS

Reference is made to and priority claimed from U.S. Provisional Application Ser. No. 60/285,396, filed Apr. 16, 2001, entitled "System and Method for Automated Driver Management;" this is further a continuation-in-part application to U.S. application Ser. No. 09/747,783, filed Dec. 22, 2000 now U.S. Pat. No. 6,832,312, entitled "Method and Apparatus for Automated Driver Management."

COPYRIGHT RIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO A COMPUTER PROGRAM LISTING APPENDIX

Reference is made to a computer program listing appendix contained within two files, named Rochford__10-128,150(1).txt, 13.0 K bytes, created Nov. 5, 2003 and Rochford__10-128,150(2).txt, 53.0 Kbytes, created Nov. 5, 2003, provided on compact disks, the contents of which are hereby incorporated by reference.

BACKGROUND OF THE INVENTION

1. Field of the Invention

The present invention relates generally to the field of setting up a computer video driver, and more particularly to the system and apparatus of an automated computer video driver management system in setting up a video driver in accordance with the video controller utilized in the computer system.

2. Description of the Prior Art

FIG. 1 is a flow diagram illustrating the process of installing a new video interface controller in a computer system. As shown in FIG. 1, conventionally, replacing a video interface controller card in a computer system involves the following process:

A) power off the computer system to avoid causing damage to components or hazardous to the person who is going to install the new video controller card (step 10);
B) remove the computer case cover to gain access to the bus for installing the new video controller card or remove the pre-existing video controller card in the system (step 12);
C) remove the old video controller adapter (step 14);
D) install the new video controller adapter in the bus of the computer system (step 16);
E) replace the case cover (step 18);
F) power on the computer system (step 20); and
G) follow video controller adapter manufacturer's directions for installing the video display driver for the new adapter (step 22).

The problem with this process is that in some cases the preexisting display drivers are not correctly removed from the system and the new display adapter tries to use those old drivers. This will result in a botched installation and will limit function to a standard VESA SVGA screen display of 640×480×4 bit color.

The above-identified problem occurs because the Windows System Registry contains no entry for a Standard VGA PCI graphics adapter device. As a result, the system is forced to identify all new video graphics adapters with the drivers it already has installed in the system. However, the driver installed previously is invariably incorrect for the new video controller adapter.

When installing an upgraded P&P (Plug and Play) graphics adapter in a computer system running Microsoft Windows 95, Windows 98, Windows ME, and Windows 2000 operating systems, several problems can occur. The first is that the computer system can become confused and attempt to use wrong video drivers for the graphics card, resulting in a configuration that is limited to the bare minimum video functions—if it functions at all. The second is that on many modern motherboards, the video controller chipsets are manufactured by a third party vendor other than Intel. Because of Intel's claim on AGP (Accelerated Graphics Port, a platform bus specification that provides high performance graphics capabilities on personal computers) technology, AGP controllers made by other vendors may need special drivers in order to allow AGP graphics cards to work correctly. Many home and business users do not know that this is an essential step before the newly installed graphic card will properly function, and as a result may cause tremendous trouble properly configuring their graphics adapters.

SUMMARY OF THE INVENTION

Automated Driver Management (ADM) addresses this problem by interacting with the user's computer system before a new graphics adapter is installed. When run, ADM actively causes the computer system to install the Standard PCI Graphics Adapter driver that is inherent to all Microsoft Windows operating systems. This driver provides a wide degree of compatibility and is suitable for the purposes of graphic adapter upgrades. This guarantees that the older video graphics driver has been removed and will not interfere with the installation of a new graphics adapter.

Briefly, a presently preferred embodiment of the present invention includes a process for installing a video display software driver in a computer system. The process includes the steps of providing a Automatic Driver Management program for automatically identifying motherboard chipset in the computer system, removing all previously installed display driver files in the computer system, and installing new display driver files into the computer system. The process further includes the steps of loading the Automatic Driver Management program in the computer system and running the Automatic Driver Management program.

An alternative embodiment of the present invention includes a system for installing a video display software driver in a computer system including a means for automatically identifying a motherboard chipset in the computer system, a means for automatically removing all previously installed display driver files in the computer system, and a means for automatically installing new display driver files into the computer system.

In yet another embodiment of the present invention includes a computer program product embodying a program of instructions executable by a machine to perform method steps for installing a video display software driver in a computer system, the product being operative to execute a method including the steps of automatically identifying a motherboard chipset in the computer system, automatically removing all previously installed display driver files in the computer system, and automatically installing new display driver files into the computer system.

The foregoing and other objects, features, and advantages of the present invention will be apparent from the following detailed description of the preferred embodiment which makes reference to the several figures of the drawing.

IN THE DRAWING

DETAILED DESCRIPTION OF THE PREFERRED EMBODIMENTS

The present invention provides a method for an automated video display driver management system. The automated video display driver management system of the present invention uses a very simple and straightforward methodology to accomplish the task of installing a driver for a video display controller adapter. The invention can be executed via Win32 API through the following process:

1) identify the operating system (OS) version of the target system and direct the code execution to the proper subroutines based on the OS version;
2) open the display control panel;
3) feed the installation sequence to the display control panel utilizing the KeyBd_Event API.

Figure 1:
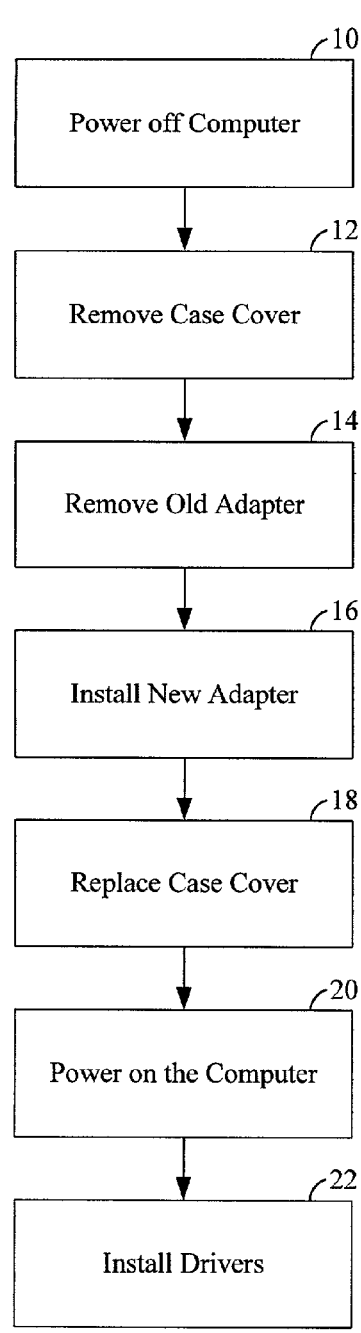
FIG. 1 is a flow diagram illustrating the conventional process of installing a new video interface controller in a computer system.
Figure 2:
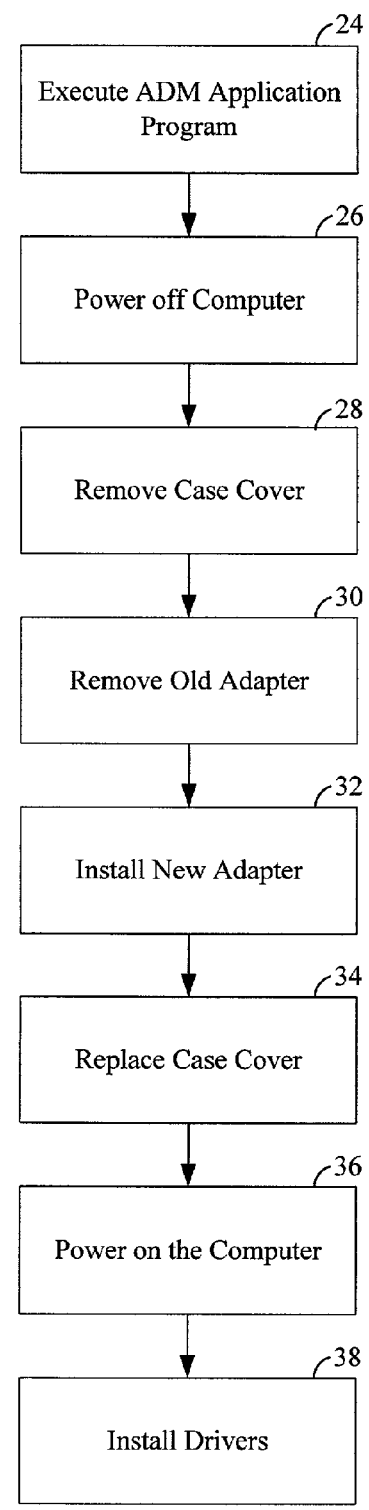
FIG. 2 is a flow diagram illustrating an exemplary process of installing a new video interface controller in a computer system of the preferred embodiment of the present invention.

As illustrated in FIG. 2, the present invention discloses a method that simplifies the process of installing a corresponding software driver when a new video controller board is installed in a computer system. The process includes the following operation:

A) execute a proprietary automated driver management (ADM) application program (step 24); (please see FIG. 3 for details of ADM operation).
B) power off the computer system to avoid causing damage to components or creating a hazard for the person who is going to install the new video controller card (step 26);
C) remove case cover to gain access to adapter cards (step 28);
D) remove the pre-existing video display controller adapter from the system bus to free up space for the new video display controller adapter (step 30);
E) install the new video display controller adapter in the system bus (step 32);
F) replace the case cover to protect adapter cards (step 34);
G) power on the computer to get it working again (step 36);
H) follow manufacturer's directions for installing the drivers for the new adapter (step 38).

This method, with ADM being run first, eliminates the problems of the new display adapter trying to use drivers for the old display adapter. Note how it fits seamlessly into the standard installation process.

Figure 3:
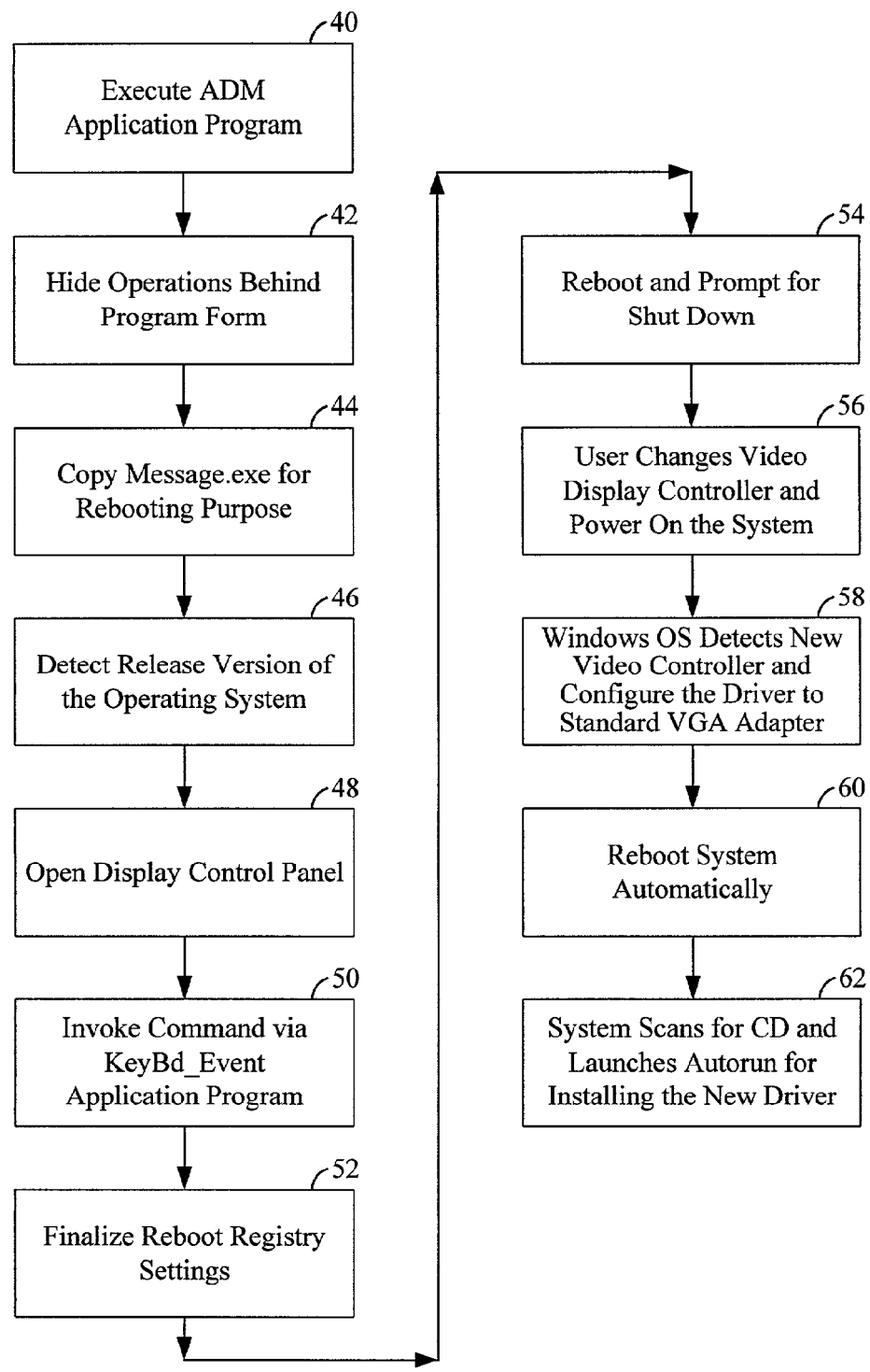
FIG. 3 is a flow diagram illustrating an exemplary embodiment of the ADM process of the present invention.

FIG. 3 is a flow diagram illustrating an exemplary embodiment of installing the software driver for the newly installed video display controller adapter in the ADM process of the present invention. The process of automatically installing a corresponding software driver for a new video display controller board comprises the following operation:

A) User selects the "Run ADM" option from the main installation screen of the installer CD to execute the ADM application program (step 40);
B) The execution of ADM application program operation is not being displayed in the program form (step 42). In one embodiment, a form containing a proprietary graphics in the form of a thermometer style progress bar or an hour-glass is being displayed instead. This is done to allow the user to monitor the progress of the operation without actually seeing all of the system operations in action.
C) A secondary program file called Message.exe is copied over to user system from the installation disk (step 44). This program will be used in a subsequent process of the ADM driver installation operation. This file is copied over at this point because the full operation of the ADM program requires the computer system to be rebooted after the installation operation is complete. In one embodiment of the invention, the installation disk is in the form of a compact disk.

When the computer system reboots, it looses all information that has not been saved to the hard drive. With the message file copied over, and with the registry setting that is implemented in subsequent step H (to be described below), the ADM program will be able to pick up where it left off when the computer starts back up after a necessary reboot.

D) ADM identifies the version of the operating system under which the system is running (step 46). This is done by examining the major and minor product release version information stored in the System Registry and interpreting the operating system type based on those version numbers. This is done because different version of the Windows operating systems use different menu systems to interact with the Windows Display Control Panel. It is essential that the operating system release version be identified for the ADM operation to be successfully performed. By detecting the operating system, the program will be able to choose the correct sequence of keystrokes that are needed to navigate the Display Control Panel.

E1/E2) These are the two different subroutines that are used to contain the instructions to be used based on the operating system type. One subroutine exists for each operating system that the program supports (Windows 95 and Windows 98). Both of these subroutines use the method described in step G (sending keyboard commands to the Display Control Panel), but they each use a different sequence of keystrokes depending on the operating system version.

F) Next is to open the Display Control Panel under the Windows operating system (step 48). This process begins the main execution operation for ADM. At this point, the Windows Display Control Panel is opened so that the ADM program will have full access to it. This is conducted by making a standard system call and running the desk.cpl file (which is the Display Control Panel in Windows 95 and Windows 98).

G) Next is to invoke command keystrokes via KeyBd_Event application program (step 50). This is the most important portion of the program's operation. At this point, keyboard commands are automatically sent to the Windows Display Control Panel that was opened just prior to this process step.

The commands are sent using the Win32 API Keybd_Event, a standard Windows system call. There is a delay of between 1500 and 3000 milliseconds between the issuance of each command to provide the computer with sufficient time to process each command before the next is issued. While a delay of 500 milliseconds was found to be appropriate, these longer delay in timing is provided ensure that certain computers not equipped with the latest technology that may be slower than the most up-to-date computer technology would also have sufficient time to process each step. This delay can be eliminated (as is planned in the next revision of the software) by examining the state of the Windows Display Control Panel and only allowing the ADM program to continue to the next command when the Display Control Panel has finished processing the last command. This will result in a very big boost in program execution time (thereby lowering the time needed to execute the program).

The sequence of keystrokes being most important to ADM, are provided below:

In a Windows 98 environment, the keystroke sequence is:
ALT-D—Presses advanced button
CTL-TAB—Moves to settings tab
ALT-C—Presses change button
ENTER—Presses next button
DOWN—Presses down arrow (to display a list of all drivers)
ENTER—Presses next button
ALT-A—Chooses show all hardware
ALT-M—Moves focus to manufactures section
HOME—Chooses first item in manufacturers section
ALT-D—Moves focus to device section
DOWN—Presses down arrow
DOWN—Presses down arrow (standard pci vga adapter is now selected)
ENTER—Presses next button
ENTER—Presses next button
ENTER—Presses next button
ALT-A—Presses apply button
ENTER—Presses close button In a Windows 95 environment, the keystroke sequence is:
ALT-A—Presses advanced button
ALT-C—Presses change button
ALT-A—Chooses show all hardware
ALT-M—Moves focus to manufacturers section
HOME—Chooses first item in manufacturers section
ALT-D—Moves focus to device section
DOWN—Presses down arrow
DOWN—Presses down arrow (standard PCI VGA adapter is now selected)
ENTER—Presses next button
ALT-A—Presses apply button
TAB—Moves focus to next button/object
TAB—Moves focus to next button/object
ENTER—Presses OK button
TAB—Moves focus to next button/object
TAB—Moves focus to next button/object
TAB—Moves focus to next button/object
ENTER—Presses close button After executing one of these subroutines, they both pass control of the program to a finishing routine in step 52 as shown in FIG. 3. In this routine there is one final keystroke that is issued and is the same for both Windows 95 and Windows 98. This is ENTER—it presses or selects the "OK" button for the confirmation dialog box that is asking if it is "OK" to reboot the computer system at this time. The "OK" must be selected or pressed so that the system reboots and the changes that have been made for the newly installed video display controller adapter can take effect. As each keystroke is issued, the thermometer bar or hour-glass as described in step 42 above increments itself in order to give an ongoing display of progress to the user.

H) Next step is to finalize the Reboot Registry settings (step 52). In this step the final entries are made to the system registry. The most important of which is the RunOnce entry to the KLM/Software/Microsoft/Windows/CurrentVersion/RunOnce registry key that makes the computer call the Message.exe program immediately when the system is rebooted. The other step is the final issuance of a keystroke (the ENTER key) that allows the computer to reboot—as mentioned at the end of step 50 described above.

I) Next step is to reboot the computer system (step 54). The computer reboots and Message.exe is being executed before the operating system can fully load, due to the registry entry that was made for it in step 52. This is a very simple program that instructs the user to perform subsequent steps in the installation process (such as physically removing the pre-existing video display controller adapter and installing the new one) and then shuts off the power to the computer. Please see FIG. 4 for more detailed description regarding the process in the Message.exe program.

J) The user substitutes the pre-existing video display controller adapter with the new adapter, and proceeds to power on the computer system (step 56).

K) During the process of rebooting the computer system, Windows recognizes a new video display adapter has been installed, and will not attempt to use drivers from the previous adapter. It will set the active display driver to the Standard VGA Adapter driver that is common to all versions of Windows and it will then cause the computer to be rebooted (step 58).

L) Once the operating system detects the new video display controller adapter, it reboots the computer system automatically with the standard VGA drive (step 60). This is the rebooting that Windows will do on its own as described in step 58. This step is needed to allow Windows an opportunity to reload all of the updated settings in effect.

M) After the computer boots up this time, a command left in the HKLM/Software/Microsoft/Windows/CurrentVersion/RunOnce registry key (entered by the Message.exe program that executed in step 54 described above) will tell it to execute a program on the main installation CD that brings up a proprietary installation screen, so that the user can choose the install driver option in order to finalize the installation of their graphics adapter (step 62).

Figure 4:
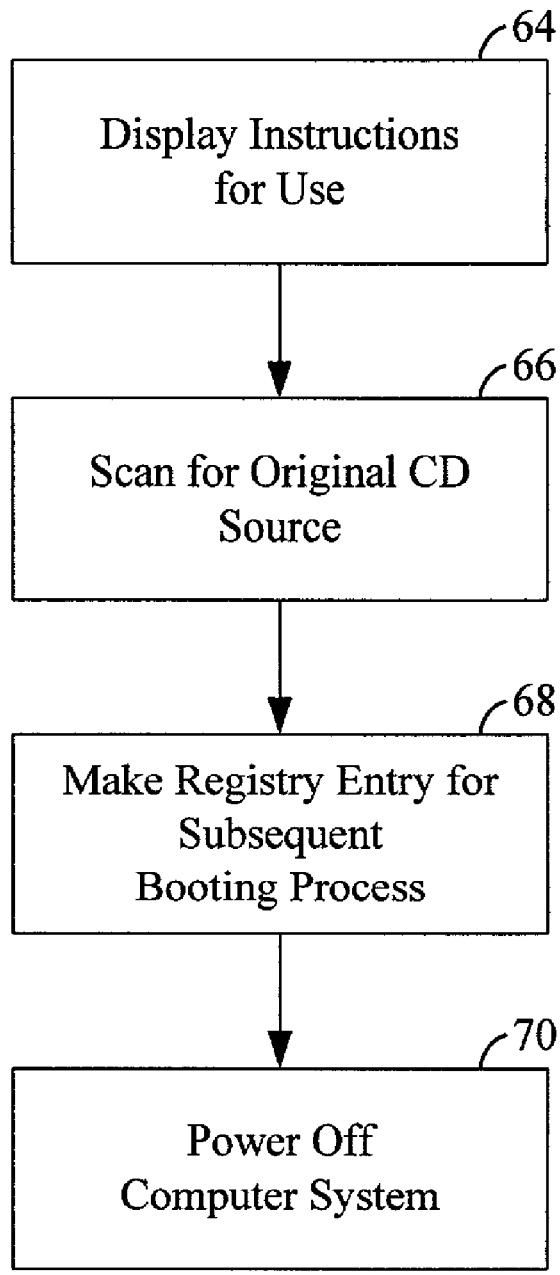
FIG. 4 is a flow diagram illustrating an exemplary process in the message.exe program of the present invention.

FIG. 4 is a flow diagram illustrating an exemplary process in the message.exe program of the present invention. Message.exe is a simple program that is meant to be a helper program for ADM of the present invention. It is used primarily to provide feedback and information to the user so that they retain a sense of control over the installation operation of the present invention. While all of the ADM and Message.exe operations could be done without any feedback to the user at all, most users would develop a very disconcerted feeling if they saw their computer engaging in so many processes with no feedback whatsoever. The operation of the program message.exe includes the following processes:

A) A standard program form is created that contains text information advising the user that the computer system will now be shut down and that they are to remove their old graphics adapter and install a new one (step 64). It further refers the user to his or her owner's manual. This is a user interface feature and is not extremely important to the overall operational process. There is also a button created on this form that following steps (steps 66–70) will be executed if the button is when clicked.

B) Message.exe now looks for the original source CD by scanning through the drive letters from lowest to highest looking for the CD (step 66). When it finds the CD it notes its location and exits the process step. It is essential to conduct this step 66 because a proprietary setup program must be executed automatically for the user when the last reboot for ADM occurs (in step 62 illustrated in FIG. 3). With this information, the location of the CD in the system can be recorded and then refer to it in future operations when necessary.

C) The location of the CD is entered into the HKLM/Software/Microsoft/Windows/CurrentVersion/RunOnce registry key for use in the next full reboot in order to automatically launch our setup CD (step 68).

D) The computer is powered off (step 70) so that the user can remove pre-existing video display controller card and install a new one.

The source code for the Automated Driver Management operation is provided in the computer program listing appendix, previously referenced, in file Rochford_10-128,150(1).txt.

Figure 5:
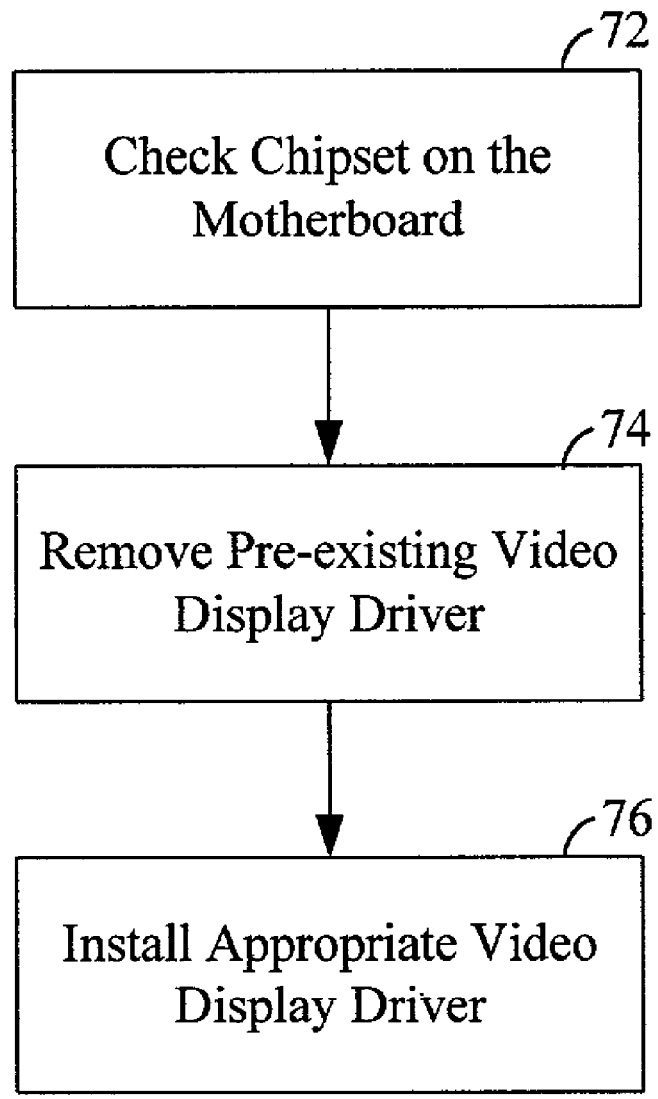
FIG. 5 is a flow diagram illustrating an exemplary overview process of installing video drivers in accordance with the present invention.
Figure 6:
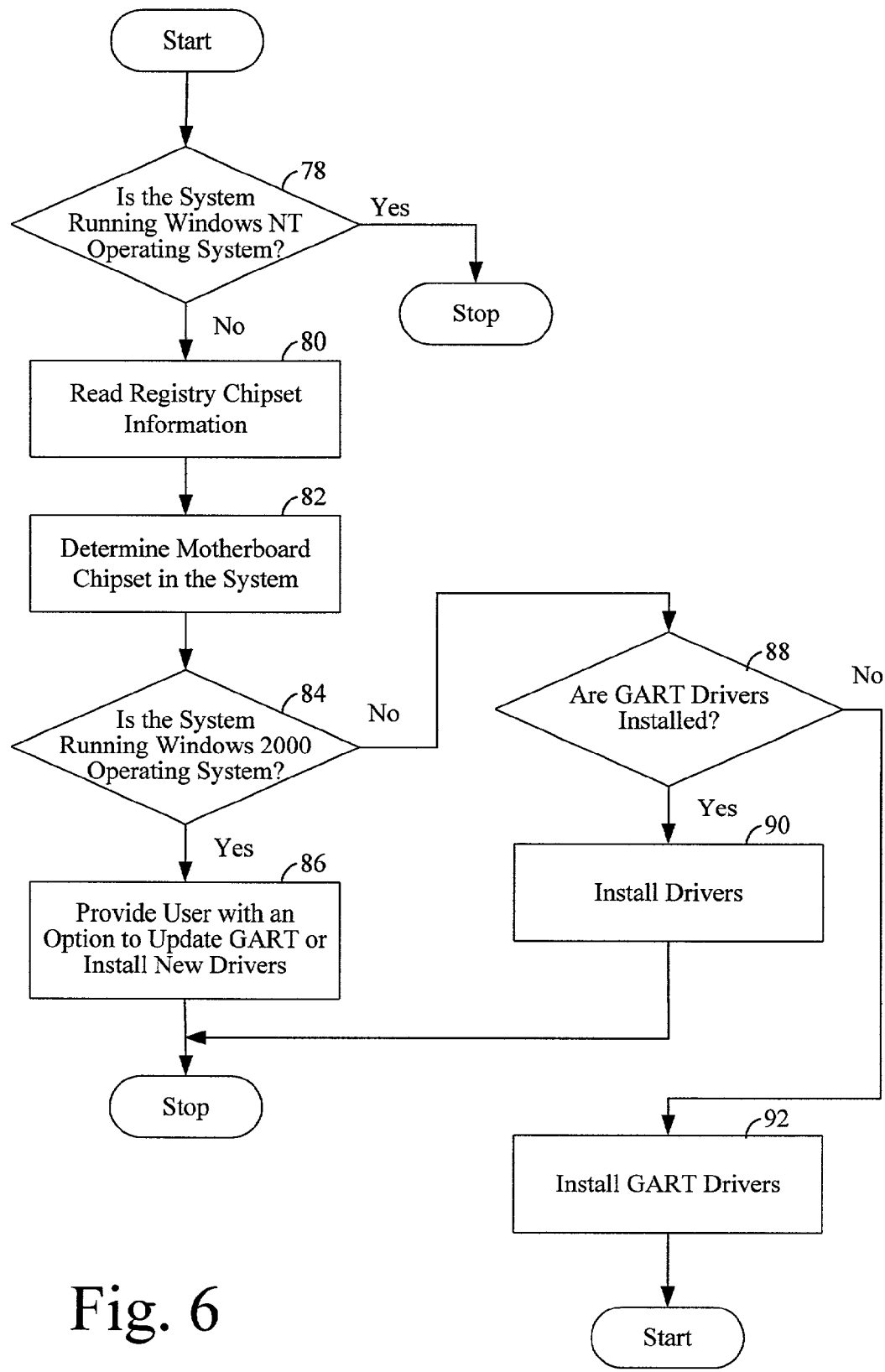
FIG. 6 is a flow diagram depicting an exemplary process of checking graphics chipset installed in a computer system.

An alternative to the above-described process address the problem by interacting with the operating system used in the computer system. As is illustrated in FIG. 5, the process involves steps in conducting chipset check (step 72), driver removal (step 74), and driver installation (step 76). The chipset check process (step 72) determines the chipset on the motherboard of the computer system, and whether or not appropriate corresponding video drivers have been installed for the motherboard to use the AGP graphics adapter In the driver removal process (step 74), searches for display driver files in the computer system are being conducted. Once the files are identified, they are removed. Further, all references to display adapters from the computer system are removed in order to force a complete re-detection of display hardware. The driver removal process eliminates the risk of utilizing a wrong display driver for the computer system. The final process (step 76) is install drivers for the appropriate display adapter in the computer system. The process includes copying all essential driver files for the display adapter so that Windows initiates a re-detection operation for the appropriate corresponding display driver.

As is described above, ADM (Automatic Driver Management) operates in three stages, with the last two working in direct conjunction with one other. The first stage is to check the chipset (step 72) on the motherboard of the computer system. In this stage, the first step is to determine the operating system in the computer system, as different approaches must be used by the software depending on the operating system. Here, the check verifies whether or not Windows NT is being used as the operating system (step 78). The process terminates if the computer system is using Windows NT operating system. Otherwise, the computer system's registry is examined to determine the hardware identification codes that it detected as being installed (step 80). Next, reference those identification codes against an internal database to find matches for the motherboard chipset—from this operation the type of chipset that is used on the computer can be identified (step 82). The next step is to determine whether or not the operating system running in the system is Windows 2000 (step 84). If the operating system is Windows 2000, then providing the user of the system with an opportunity to either update the Graphic Aperture Remapping Table (GART) or to install new drivers in the system (step 86) and terminates the process after it is done. A GART is a table used to map pages of graphics information into memory. If the operating system is not Windows 2000, then based on the type of chipset identified, examine the registry to determine whether appropriate GART drivers are installed in the system (step 88). If GART drivers are installed, then proceed to install display drivers (step 90) and terminates the process after display drivers are installed. Otherwise, install GART drivers before display drivers are installed and go back to the beginning of this process to verify appropriate drivers are being installed in the computer system.

Figure 7:
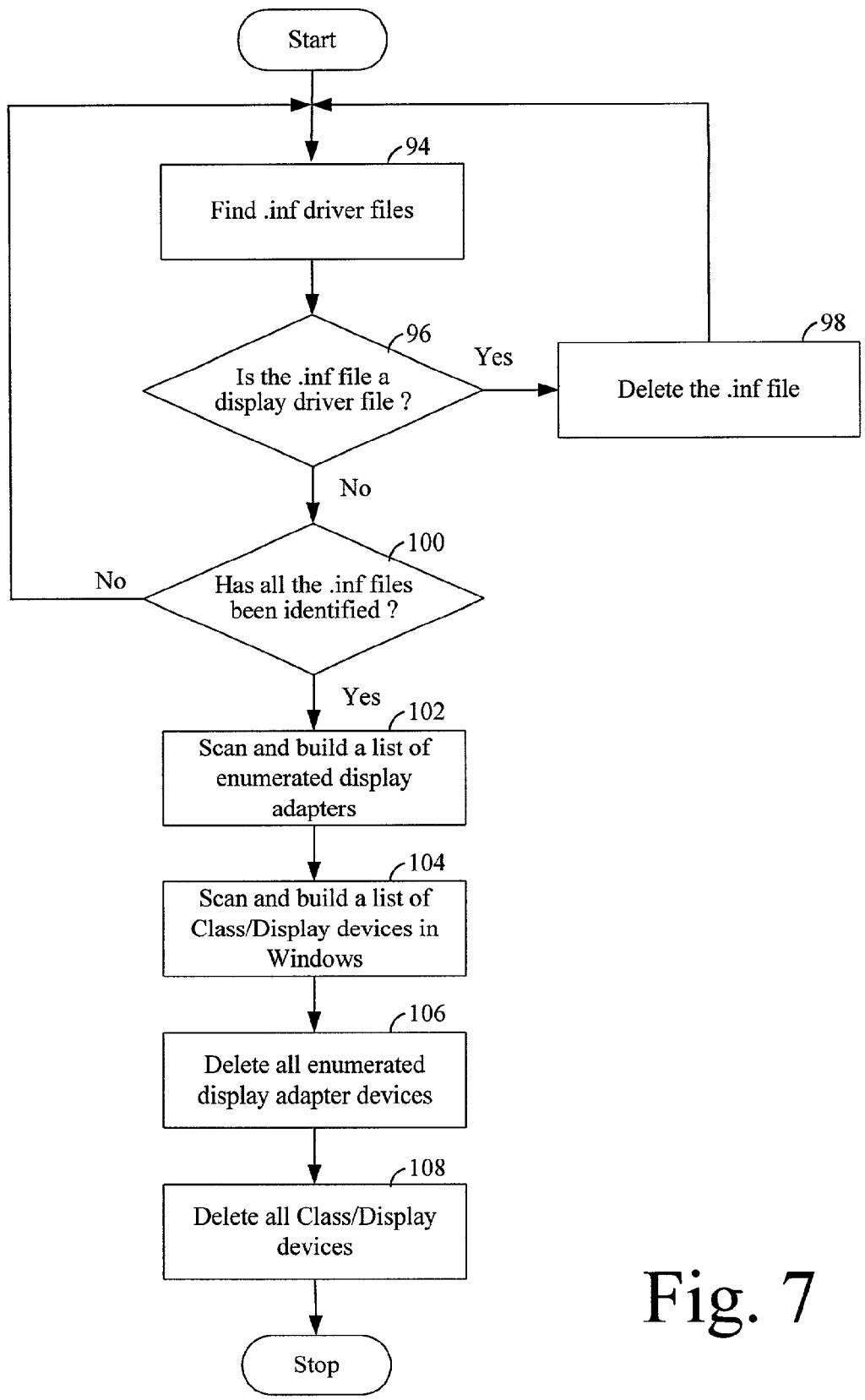
FIG. 7 is a flow diagram showing an exemplary process of removing video driver files in a computer system according to the present invention.

After the chipset on the motherboard has been identified and appropriate GART driver has been installed, the next major operation is to remove the pre-existing files in the system related to video display. The driver removal process is illustrated in FIG. 7. The process starts with searching all the .inf driver files in the hard drive of the computer system (step 94). Next, identified .inf flies must be determined whether or not they are display driver files (step 96) and delete any that are display driver files (step 98). The process of deleting display driver files continues until all .inf files have been identified (step 100). Next is to examine the computer's registry and build a list of all graphics adapters detected (step 102) and examine the computer's registry and build a list of all display drivers installed (step 104). The process continues with removing all graphics adapters from the registry (step 106) and remove all installed display drivers from the registry (step 108).

Figure 8:
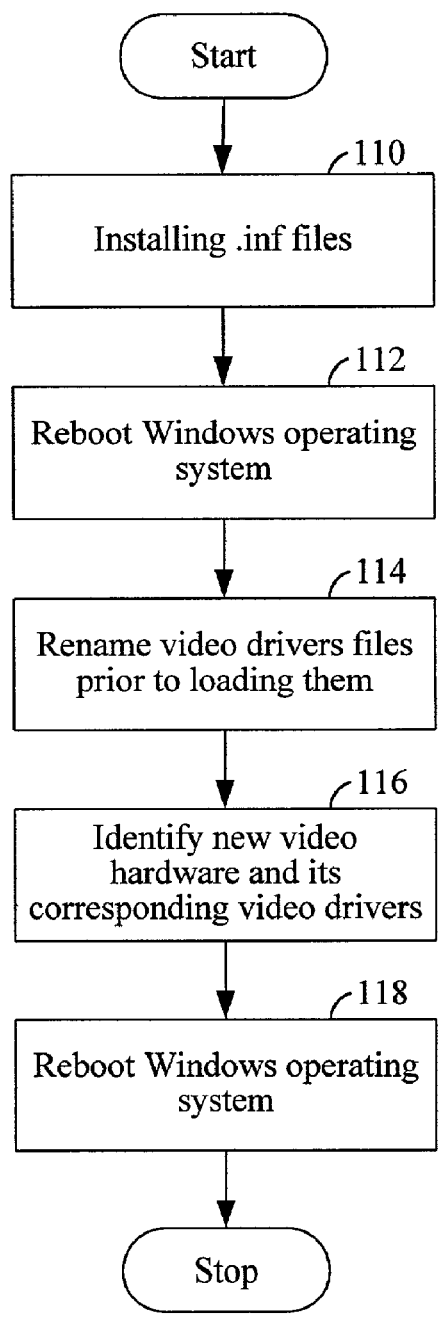
FIG. 8 is a flow diagram illustrating an exemplary process of installing new video drivers for a new video card installed in a computer system according to the present invention.

The last stage of the automated driver management operation is to install new drivers, which is illustrated in FIG. 8, for the video display hardware in the computer system. The process starts with using a tailored .inf file, coping all needed driver flies to the computer using the Windows "setup.dll" program (step 110). This process allows newer version of the files to be copied onto the system even though such files are in existence in the system. The tailored .inf file will copy flies with a name different from their ultimate name eventually used in the computer system and have these names renamed in subsequent booting process before the operating systems attempt to load them and putting them back in use. Next step is to reboot the Windows operating system (step 112), and renaming all files to their correct name prior to loading them (step 114). This is done so as to allow older files of the same name to be updated with newer versions, even though they might be currently in use by the computer system, which does not allow any overwriting to the files. Next is to identify new video hardware and its corresponding video drivers (step 116). This process occurs automatically because after removing the pre-existing driver files, the Windows is responding to the situation as a new video hardware has been installed in the system and would trigger the Windows' internal operation to installation and driver search processes. Next, the Windows operation will reboot the computer system and allow Windows to detect the card and use the newly installed drivers (step 118).

The source code for carrying out the operation described above is provided in the computer program listing appendix, previously referenced, in file Rochford_10-128,150(2).txt.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A process for installing a video display software driver in a computer system, comprising:
    providing a Automatic Driver Management program for
        automatically identifying motherboard chipset in the computer system,
        removing all previously installed display driver files in the computer system including any display driver files not listed in the add/remove programs dialog box of an operating system, and
        installing new display driver files into the computer system;
    loading said Automatic Driver Management program in said computer system; and
    running said Automatic Driver Management program.

2. A process for installing a video display software driver in a computer system as recited in claim 1, wherein automatically identifying the motherboard chipset further includes:
    determining a configuration of said motherboard chipset by reading chipset information in the registry of the computer system; and
    determining whether or not GART driver needs to be updated based on said configuration of said motherboard chipset.

3. A process for installing a video display software driver in a computer system as recited in claim 1, wherein automatically removing all previously installed display driver files includes establishing a list of enumerated display adapters and deleting all enumerated display adapter files.

4. A process for installing a video display software driver in a computer system as recited in claim 1, wherein the step of installing the new display driver files into the computer system includes using temporary names for the new display driver files during installation, and renaming said new display driver files to their ultimate names during a subsequent rebooting process.

5. A system for installing a video display software driver in a computer system, comprising:
    means for automatically identifying motherboard chipset in the computer system;
    means for automatically removing all previously installed display driver files in the computer system including any display driver files not listed in the add/remove programs dialog box of an operating system; and
    means for automatically installing new display driver files into the computer system.

6. A system for installing a video display software driver in a computer system as recited in claim 5, wherein the means for automatically identifying motherboard chipset further comprises:
    means for determining a configuration of said motherboard chipset by reading chipset information in the registry of the computer system; and
    means for determining whether or not GART driver needs to be updated.

7. A system for installing a video display software driver in a computer system as recited in claim 5, wherein the means for automatically removing all previously installed display driver files includes means for establishing a list of enumerated display adapters and deleting all enumerated display adapter files.

8. A system for installing a video display software driver in a computer system as recited in claim 5, wherein the means for installing the new display driver files into the computer system includes means for using temporary names for the new display driver files during installation, and means for renaming said new display driver files to their ultimate names during a subsequent rebooting process.

9. A computer program product embodying a program of instructions executable by a machine to perform method steps for installing a video display software driver in a computer system, said product being operative to execute a method comprising:
    automatically identifying motherboard chipset in the computer system;
    automatically removing all previously installed display driver files in the computer system including any display driver files not listed in the add/remove programs dialog box of an operating system; and
    automatically installing new display driver files into the computer system.

10. A computer program product as recited in claim 9, wherein the identifying motherboard chipset further comprises:
    determining a configuration of said motherboard chipset by reading chipset information in the registry of the computer system; and
    determining whether or not GART driver needs to be updated based on said configuration of said motherboard chipset.

11. A computer program product as recited in claim 9, wherein the process of automatically removing all previously installed display driver files includes establishing a list of enumerated display adapters and deleting all enumerated display adapter files.

12. A computer program product as recited in claim 9, wherein the step of installing the new display driver files into the computer system includes using temporary names for the new display driver files during installation, and renaming said new display driver files to their ultimate names during a subsequent rebooting process.

* * * * *